United States Patent
De Jaeger et al.

(10) Patent No.: US 8,301,131 B2
(45) Date of Patent: Oct. 30, 2012

(54) METHOD FOR OPTIMIZING THE TRANSMISSION RESOURCES BY LOCAL LOOPBACK IN A MOBILE RADIO COMMUNICATION CELLULAR NETWORK, NETWORK AND LOCAL ADAPTERS THEREOF

(75) Inventors: Bogéna De Jaeger, Paris (FR); Michel Mouly, Palaiseau (FR); Didier Verhulst, La Celle St Cloud (FR)

(73) Assignee: CELL & SAT, Paris (FR)

( * ) Notice: Subject to any disclaimer, the term of this patent is extended or adjusted under 35 U.S.C. 154(b) by 806 days.

(21) Appl. No.: 12/282,803

(22) PCT Filed: Mar. 12, 2007

(86) PCT No.: PCT/EP2007/052305
§ 371 (c)(1),
(2), (4) Date: Feb. 23, 2009

(87) PCT Pub. No.: WO2007/104743
PCT Pub. Date: Sep. 20, 2007

(65) Prior Publication Data
US 2009/0215455 A1    Aug. 27, 2009

(30) Foreign Application Priority Data

Mar. 14, 2006 (FR) ..................... 06 02222
Mar. 14, 2006 (FR) ..................... 06 02223
Dec. 29, 2006 (FR) ..................... 06 11565

(51) Int. Cl.
*H04M 3/00* (2006.01)

(52) U.S. Cl. ..................... 455/418; 455/445; 455/550.1; 379/121.01

(58) Field of Classification Search .................. 455/418, 455/445, 422.1, 550.1; 379/121.01
See application file for complete search history.

(56) References Cited

U.S. PATENT DOCUMENTS 5,761,195 A   6/1998  Lu et al. ............... 370/329
(Continued)

FOREIGN PATENT DOCUMENTS
EP   0 797 319   9/1997
(Continued)

OTHER PUBLICATIONS

International Search Report from counterpart foreign Application No. PCT/EP2007/052305.
(Continued)

*Primary Examiner* — Danh Le
(74) *Attorney, Agent, or Firm* — David D. Brush; Westman, Champlin & Kelly, P.A.

(57) ABSTRACT

A method for transmitting data in a mobile radio communication cellular network, wherein setting up, maintaining and terminating a data communication channel between a caller and a called party located in the cellular network are implemented by the exchanges of signaling messages. A caller and/or a called party each is located in a local zone of the cellular network. The method includes: a first detecting phase if the caller and the called party of the communication are located in the same local zone of the cellular network, according to a detection strategy including a step of analyzing all or a portion of the signaling messages; and then triggering a local loopback operation of all or a portion of the data exchanged between the caller and the called party, in the case where the detecting phase confirms the local nature of the communication between the caller and the called party.

29 Claims, 10 Drawing Sheets

U.S. PATENT DOCUMENTS

| | | | | |
|---|---|---|---|---|
| 5,999,817 | A | * | 12/1999 | Posti et al. .................... 455/439 |
| 6,128,291 | A | * | 10/2000 | Perlman et al. ............... 370/352 |
| 6,256,503 | B1 | * | 7/2001 | Stephens .................... 455/456.6 |
| 2002/0151303 | A1 | | 10/2002 | D'Allest ....................... 455/427 |
| 2002/0196918 | A1 | * | 12/2002 | Culli et al. ............... 379/121.01 |
| 2004/0024791 | A1 | | 2/2004 | Martin et al. ................. 707/200 |
| 2004/0198398 | A1 | | 10/2004 | Amir et al. | |

FOREIGN PATENT DOCUMENTS

| | | |
|---|---|---|
| EP | 1 282 320 | 2/2003 |
| EP | 1 387 592 | 2/2004 |
| EP | 1 528 714 | 5/2005 |
| FR | 2 803 713 | 7/2001 |

OTHER PUBLICATIONS

French Search Report from counterpart foreign Application No. 06/02222.

French Search Report from counterpart foreign Application No. 06/02223.

ETSI ES 201 235-1 V1.1.1 (Sep. 2000) "Specification of Dual Multi-Frequency (DTMF) Transmitters and Receivers; Part 1: General". European Telecommunications Standards Institute 2000.

* cited by examiner

METHOD FOR OPTIMIZING THE TRANSMISSION RESOURCES BY LOCAL LOOPBACK IN A MOBILE RADIO COMMUNICATION CELLULAR NETWORK, NETWORK AND LOCAL ADAPTERS THEREOF

CROSS-REFERENCE TO RELATED APPLICATIONS

This Application is a Section 371 National Stage Application of International Application No. PCT/EP2007/052305, filed Mar. 12, 2007 and published as WO 2007/104743 on Sep. 20, 2007, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of communication networks. More precisely, the invention relates to cellular networks such as in particular, but not exclusively, GSM ("Global System for Mobile") or UMTS ("Universal Mobile Telecommunications Service").

The disclosure applies to any cellular network wherein it is useful to optimise the use of transmission resources.

It applies particularly, but not exclusively, to a cellular network comprising for example a radio link via satellite making it possible to connect a set of stations, called base stations (BTS in the case of the GSM network), with a central equipment called Hub, itself connected to the base station controllers (BSC in the case of the GSM network). In this case, the satellite resource naturally constitutes a resource that is expensive to use, and for which it is interesting to optimise and save as much as possible.

As such the disclosure is particularly adapted to the implementation of a cellular network in areas where the communications traffic is relatively low, such as the rural areas for example, and where conventional techniques require relatively high investment and relatively high operating costs with regards to this low traffic.

But it applies more generally to any situation where resource management is critical.

BACKGROUND OF THE DISCLOSURE

First of all, it is important to note that, with a concern for clarity, the disadvantages of prior art are presented here in the particular case of the GSM standard. However, an embodiment of this invention applies to any type of cellular network, such as for example those defined by the 3GPP project (for "Third Generation PartnerShip Project"). Those skilled in the art can easily implement an embodiment of this invention in a network of the UMTS type or other type.

The increasing popularity of the GSM system across the entire world has led the operators to deploy this service not only in the metropolitan regions, but also more and more in rural areas and in more isolated or remote areas. In this latter type of regions, a land infrastructure is often insufficient or poorly adapted in providing good network coverage. A radio link system via satellite is then a very good way to extend the GSM service and this type of system is commonly used today in many regions of the world.

However, satellite radio resources are still costly today, and the problem with this type of application resides in the techniques for reducing the bandwidth needed to transmit data via satellite radio.

Such a problem remains particularly valid in the case where two users are located in the same geographic cell, or at least located in cells that are close to one another. In such a case, it is understood that the conventional techniques for transmission in a GSM network, by definition centralised, consume traffic resources that are much higher than what an optimised routing would make possible.

For more clarity, the disadvantages of the prior art are described hereinafter in the specific case of a GSM system implemented through the intermediary of a satellite link, and wherein two users located in the same cell or in two cells that are sufficiently close in the GSM network, downstream of the satellite link, are in communication.

1. Architecture of GSM

In relation with FIG. 1, the conventional architecture of a cellular network of the GSM type comprises a mobile service switch 10, called MSC (for "Mobile Switching Centre"), a base station controller 11, called BSC (for "Base Station Controller") and finally one or several base stations 12, called BTS (for "Base Transceiver Station").

Each BTS provides the GSM radio coverage in one or several cells. By way of example, in relation with FIG. 1, the BTS 121 is controlled by the BSC 11 and covers the geographic cell 13, wherein is located a certain number of users having a Mobile station (MS) for radio communication 14.

More precisely, the MSC controls the configuration of calls for each incoming or outgoing call, and it has the role of an interface with the other telecommunication networks. Each communication goes through the MSC, which controls several BSC.

The BSC is in charge of allocating the radio channels needed for each call. It handles the intercellular transfers between two BTS. A single BSC supports several BTS which provides coverage for a large geographic zone.

Finally, a BTS has for role to carry out the GSM radio transmission with the users of Mobile Stations. The BTS are located in the vicinity of towers 122 supporting antennas, and distributed in the geographic space of coverage of the cellular network.

The GSM standard and its evolutions, such as defined by the 3GPP group (for "Third Generation Partnership Project"), make use of voice compression. This compression is carried out by a transcoder also called TC. According to the GSM standard, the TC can be implemented at the MSC site, at the BSC site or at the BTS site. Economic considerations lead to implementing more preferably the TC at the MSC site, so as to reduce transmission costs.

Several types of codecs have been defined by the 3GPP group. The codec GSM FR "full rate" codec operates at a rate of 13 kbit/s. The HR "half rate" and EFR "enhanced full rate" codecs operate at 5.6 kbit/s and 12.2 kbit/s respectively. After transcoding, speech at 64 Kbit/s compressed to 13/12.2 kbit/s (respectively 5.6 kbit/s) is carried to the base station BTS over a time slot at 16 kbit/s (respectively 8 kbit/s). According to the 3GPP TS 08.60 (respectively TS 08.61) specification, the compressed speech is transmitted to the BTS every 20 ms according to the frame format TRAU (for "Transcoder and Adaptation Unit").

These same principles apply to the AMR ("Adaptive Multi Rate") full rate FR and reduced rate HR codings.

The TRAU frame carries, in addition to compressed speech data, signalling data of the "control bits" type making it possible to optimise the quality of the communications between the transcoding entity TC and the channel coding/decoding unit CCU (for "Channel Codec Unit") with the BTS. These control bits make it possible in particular to provide the synchronisation of the data exchanged, to define the type of codings used (FR, EFR, HR or AMR), and also to indicate the discontinuity of the transmission linked to the silence in the speech (DTX).

In such a way as to introduce the implementation of a satellite link within a cellular network, in relation with FIG. 2, the interfaces implemented are now described succinctly and their denomination between the main entities introduced previously.

The PSTN (for "Public Switched Telephone Network") is denoted as PSTN 22.

The interface between the MSC 10 and a BSC 11 is referred to as interface A.

The interface between a BSC 11 and the BTS 121 is referred to as the interface Abis.

In the case where the TC 21 is implemented at the MSC site 10, the interface between the TC 21 and the BSC 11 is called Ater.

A satellite link can be used within the transmission chain for each of these interfaces. The main problem with inserting a satellite link on one of these interfaces is then to determine how to effectively transmit the necessary data while minimising the radio band needed for the transmission via satellite.

The interface A, used between a MSC and a BSC, is constituted of one or several 2 Mbit/s links (ITU G703/G704 standard). Each 2 Mbit/s link supports 30 uncompressed voice channels—at 64 kbit/s—and one signalling channel SS7. The number of 2 Mbit/s links depends on the sizing of the BSS subsystem. The signalling channel contains messages indicating in particular the traffic needs according to the number of communications.

The interface Abis connects a BSC with a BTS and is constituted of one or several 2 Mbit/s links (ITU G703/G704 standard). It is one of the interfaces which is conventionally implemented with a transmission via satellite.

This interface Abis carries traffic data, such as compressed voice and signalling data.

On the interface Abis, two types of signalling data circulate:
- signalling messages exchanged with the BTS, transported in a specific signalling channel, which make it possible to control the BTS equipment itself as well as the mobile station (MS) which are in relation with it. The corresponding messages are specified by the GSM in the TS 08.58 specification.
- control "in band" data which is transmitted in the same flow as the traffic data. This data is transmitted within TRAU frames. This data is "control bits", complementary to the "data bits", of which the meaning is explained in the TS 08.60/08.61 specifications.

The signalling data of the first type, constituted of protocol messages, is carried over dedicated time slots, with typically over the interface Abis a rate of 64 kbit/s.

Each 2 Mbit/s link of the interface Abis has 31 time slots (TS) which are allocated to the signalling channels or to the speech channels. According to the typology of the network and coding choices for the speech, a 2 Mbit/s link on the interface Abis can typically be used to support up to ten radio transmission access channels, called TRX ("Transceiver").

Each TRX in turn supports eight GSM channels dedicated to speech at full rate FR or sixteen GSM channels at half rate HR. The corresponding reservation of the speech channels on the interface Abis represents for each TRX an allocation of 2 TS at 64 Kbit/s (8*16 Kbit/s=16*8 Kbit/s=128 Kbit/s.

According to the sizing of the GSM network, the BTS is equipped with a number N of TRXs, which induces a proportional occupation of the number of TS on the interface Abis.

2. Satellite Applications

A conventional GSM network implementing a radio link of the satellite type is described in relation with FIG. 3.

The GSM connecting network then comprises, conventionally, a MSC 30, a BSC 31 as well as a base station BTS 32, providing the communications to users having a mobile terminal 34 and located in the coverage area of the BTS 32.

In addition, a radio link 36 is implemented on the interface Abis, between the BSC 31 and the BTS 32. This radio link 36 is provided by a radio system via satellite containing two antennas 331 and 332 for emitting-receiving on each side of the interface Abis, and a satellite 35.

Note that it is possible in fact to insert a radio link via satellite on each of the interfaces implemented in the GSM system: A, Abis, Ater. But the insertion of such a satellite link on the interface Abis, i.e. between a BSC and BTSs, is very often preferred in order to extend the GSM service to remote geographic locations and of a low density of users with minimal infrastructural costs.

So as to avoid any confusion, it is important to note that in such an implementation, two types of radio systems are implemented, but that they do not have the same role:
- The GSM network itself uses a first radio link to communicate, and in particular to carry out the transmission between the BTSs and the users of mobile station.
- The satellite system consists of a second radio transmission link. Conventionally, a device called Hub allocates the radio resources needed for the transmission of data by satellite between BSC and BTS.

In what follows of the description, radio resources are referred to: this denomination thus concerns the radio transmission link via satellite, but it can be extended according to an embodiment of the invention to any other type of radio link with shared resources, as for example links via radio beams ("microwaves"), or systems of the LMDS type ("Local Multipoint Distribution Systems"), or other land transmission systems of the WiFi, WiMAX (for "Wireless Microwave Access") type, etc.

An embodiment of this invention applies in particular to configurations using a satellite channel managed in DVB-S/DVB-RCS mode.

Concretely, when two users are in communication, the usual realisation in a GSM network demands that the flow of speech transit through the BSC, as well as through the MSC. This then requires the allocation of resources on two channels of the satellite link: the upstream connection and the downstream connection. This in particular remains valid regardless of the position of the users (caller and recipients), and particularly when the two users are located in the same cell or in two nearby cells.

3. Disadvantages of Prior Art

To date, the implementation of a radio link, via satellite in particular, between a BTS and the corresponding BSC of a cellular network systematically results in, during a communication between two users each served by a BTS connected via satellite, the allocation of two radio channels: a first for the called party and a second for the caller.

Indeed, the usual application demands that the speech be transmitted "all the way up" to the MSC of the GSM network.

The flow of speech thus passes twice via the satellite, even if the communication at hand is of a local nature. So a local communication suffers needlessly from the addition of twice the transfer time via satellite, of a magnitude of 250 milliseconds. The existence of this double satellite link therefore adds not only non-negligible transmission time which is reflected in the quality of the communication as perceived by the users, but it is in addition very costly.

This situation has been accepted up until now.

So, to date there are no means making it possible to specify the local nature of a call. Current techniques therefore do not handle such a configuration in an optimised manner.

SUMMARY

An aspect of the disclosure relates to a method of data transmission in a radio communications mobile cellular network, method of the type consisting in setting up, maintaining and terminating a data communication channel between a caller and a called party located in said cellular network, a caller and/or a called party each being located in a local zone of the cellular network, the setting up, the maintaining and the termination of the data communication channel implementing the exchanges of signalling messages.

According to an embodiment of the invention, such a method comprises:

a first phase to detect if the caller and the called party of the communication are located in the same local zone of the cellular network, according to a detection strategy including a step of analysing all or a portion of the signalling messages;

a second phase to trigger a local loopback operation of all or a portion of the data exchanged between the caller and the called party, in the case where the detecting phase confirms the local nature of the communication between the caller and the called party.

Preferentially, said step of analysing all or a portion of the signalling messages is implemented by a device located upstream of at least one base station of the cellular network and downstream of a base station controller.

Preferentially, said local loopback operation is implemented by a device located upstream of at least one base station of the cellular network and downstream of a base station controller.

For example, it is the same device that implements the aforementioned steps of analysing and local loopback.

An embodiment of the invention is therefore based on an approach which is entirely new and inventive of a direct loopback of the flow of data exchanged between a caller and a called party when the latter are located in the same local zone. An embodiment of the invention implements for this a detection strategy according to which are spied and analysed the signalling flow containing a succession of messages intended solely for the equipment in the cellular network, and, or, or in combination, the data exchanged between the users. According to the results of this analysis, the method of an embodiment of the invention loops back the data to be transmitted during a communication, if the latter is of a local nature, and this in a manner that is entirely transparent for the cellular network, which is completely unaware of this looping back. The operation of the cellular network is therefore in no way disturbed.

This method thus makes it possible to gain judiciously in terms of transmission time. In addition, it applies to all types of data, such as data with a high real-time constraint, such as speech, but also to other types of data conventionally exchanged via a cellular network, i.e. an SMS, an image, etc.

Advantageously, the local zone is defined by the coverage area downstream of the base station, or by a set of base stations.

As such, the method makes it possible not only to loop back the data transmitted between two users when their mobile station depend on the same base station, i.e. when they are located in the same cell of the cellular network, but also when the users are located for example in neighbouring cells. In this case, they depend on two different base stations and the method is implemented upstream of a set of base stations.

Note that in the case of GSM, a base station is called BTS, and the method is then implemented upstream of an Abis link or of a set of Abis links. However, more generally, an embodiment of the invention also applies to any cellular network that implements base stations, such as UMTS in particular, which corresponds to an evolution of the GSM network.

Advantageously, the base station being controlled by a base station controller from among a plurality of base station controllers and the base station(s) being connected with the base station controller(s) via a connecting network, the local loopback consists in carrying all or a portion of the data exchanged between the caller and the called party without transiting by the base station controller(s).

As such, in a cellular network such as GSM for example, wherein the base stations are controlled by a base station controller, called BSC, the method of an embodiment of the invention implements a loopback between two users in communication, in such a way that the data that is looped back does not revert back up to the BSC. It is directly looped back. This therefore differs from a conventional implementation of a cellular network, wherein all of the data is systematically transmitted to the base station controller, regardless of the location of the parties. The method of an embodiment of the invention thus makes it possible to save steps of double data compression/decompression, or also transcoding, especially in the particular case with speech, and this in a manner that is transparent for the cellular network, which is not aware of the loopback.

Advantageously, the succession of the signalling messages forming a signalling flow, the detection strategy includes a step of injecting into the signalling flow at least one piece of tracking data on the local zone of the caller and/or of the called party, and in recognising the tracking data in the local zone of the other of the parties.

In an embodiment of the invention, the invention thus implements its detection strategy of the local nature of a call by injecting a piece of tracking data into the signalling flows corresponding to each of the two parties in the progress of communication. Signalling flows here refers to the succession of signalling messages. The injection of a piece of tracking data into the signalling flow can then consist of injecting a specific message among the already existing messages, or injecting data within the messages themselves. The objective is then to find this same data again in each of the signalling flows of the caller and the called party.

Advantageously, the tracking data is constituted by at least one piece of data representative of the local zone, and/or a marker specific to the call within the calls in progress in the local zone.

An embodiment of the invention detects data pertaining to the location of the parties in the signalling flow as well as, if necessary, a marker concerning the call itself.

Advantageously, the signalling messages are compliant with the GSM standard and the tracking data is encoded in the User-User field of the CONNECT message or of the SETUP message.

In the case of cellular networks according to the GSM standard as well as its changes, an embodiment of the invention utilises the User-User field of the CONNECT or SETUP signalling message to inject the data specifying the location of the users of the cellular network.

Advantageously, the detecting phase comprises a prior step of detecting the time correlation between the emission and the reception of predetermined signalling messages.

As such, in addition to injecting data, the detection strategy of the local nature of a call implements a prior detection of the contents of the signalling flows. In other terms, if an event in a half-call implies, through the standard, another event in another half-call, the detection of the succession of the two events within a reasonable timeframe, is considered as an indication that a local communication is likely to be taking place.

Advantageously, the predetermined events belong to the group comprising:
  transmissions of SETUP (departure) and PAGING (arrival) messages
  transmissions of CONNECT (arrival) and CONNECT (departure) messages.

Such signalling messages are found in a cellular network of the GSM type or in the evolutions of this standard.

Advantageously, the detection strategy is accomplished in two periods:
  implementation in a first period of time of the step of detecting the time correlation between the transmissions of predetermined signalling messages;
  implementation in a second period of time of the step of injecting the tracking data if and only if a time correlation has been detected.

Following a first step of detecting the time correlation, the method can, in an embodiment, implement a step of injecting data, in such a way as to confirm or not confirm that a communication in progress is local.

Advantageously, the traffic channel of the communication carrying data with a real-time constraint, such as a flow of speech, the detection strategy includes a direct analysing phase of the data with a real-time constraint.

In the particular embodiment of the voice communication for example, wherein the data transmitted is of the voice type, the detection strategy of the local nature of a call is in a position to directly analyse the flow of speech.

Advantageously, the data including a flow of speech, the analysing phase of the flow of speech comprises an additional step of injecting into the flow of speech of a signal of the DTMF type on the local zone of one of the parties (caller or called party) and of recognising the tracking data in the local zone of the other of the parties.

As such, according to the same approach as that implemented on the signalling flow, the detection strategy proposes to directly inject tracking data into the flow of speech itself, so that the latter can be recognised by the method which is then in a position to detect the local nature of a communication.

Advantageously, the data includes a flow of speech, and the cellular network being compliant with the GSM standard, the step of analysing the flow of speech is implemented after the TFO mode has been activated.

In other terms, it is possible to implement the method of the invention in a particular embodiment, wherein the TFO mode is activated.

Advantageously, the TFO mode being activated, the step of direct analysis comprises a phase of injecting at least one piece of specific data into the flow of speech in order to accelerate the detection of the identity between the two flows in relation to a simple comparison of the speech.

Advantageously, the connecting network including at least one link of the radio with shared resources type between the base station(s) (downstream) and the base station controller(s) (upstream), the local zone is defined by the zone located downstream of a connection point with the link of the radio with shared resources type.

In other terms, an embodiment of the invention can be implemented in the specific case where the link between a set of base station controllers and the base stations of a cellular network is supported by a radio link with shared resources. In this embodiment, the method of the invention implements a local loopback as soon as two users are located downstream of a point of termination of the radio link between the BTS(s) and the BSC(s). In this particular embodiment of the invention, the local loopback is of a great interest since it is carried out downstream of the radio link: it thus makes it possible to save a large allocation quantity of radio resources, which are currently very costly.

Advantageously, the second phase of triggering a local loopback operation implements a loopback of the data between the caller and the called party, in such a way that no data is lost.

Indeed, if the loopback is detected and activated during communication, it is important that none of the data is lost, even if the allocation of the communication channels changes during the communication.

Advantageously, the second phase of triggering a loopback operation comprises a preliminary phase of storing in a memory buffer of the data coming from the correspondent, in such a way as to ensure continuity in the flow of data to be transmitted.

As such, the memory buffer ensures that no data to be transmitted will be lost, during a communication, even if the channels allocated for the communication vary.

Advantageously, the method of an embodiment of the invention comprises the following additional steps of:
  searching for, detecting and analysing in the signalling messages data indicating a displacement of the called party and/or of the correspondent, during communication;
  adaptation of the communication channels according to the result of the step of searching, detecting and analysing.

In other terms, an embodiment of the invention handles inter-cellular displacements ("handovers") of the parties, in the process of communication. As such, the method makes it possible to adapt, in the case where a normal communication becomes local or inversely, in such a way as to set up or not set up, or suppress or not suppress, a loopback.

Advantageously, the data indicating a displacement is constituted by a signalling message indicating the characteristics of a new cell of the cellular network between the called party and/or the caller in displacement.

The method of an embodiment of the invention handles and therefore analyses the displacements always according to the same approach of detecting and analysing signalling messages intended for the cellular network.

Advantageously, the signalling messages are compliant with the GSM standard, and the message is the HANDOVER_COMMAND message.

Advantageously, the step of adapting comprises the phases of:
  adapting the loopback if the result of the analysis of the data indicating a displacement indicates that the caller and/or the called party is changing cells while still remaining in the loopback zone;

stopping the loopback operation if the result of the analysis of the data indicating a displacement indicates that the caller and/or the called party are leaving the loopback zone;

The method of an embodiment of the invention detects and adapts to any type of intercellular transfer, in the case where one of the parties changes cells while still remaining in the loopback zone (the loopback is maintained), as well as in the case where one of the parties leaves the loopback zone (the loopback is cut off and the operation becomes "conventional" again).

In an embodiment of the invention and in a situation of loopback, all or a portion of said data exchanged between the called party and the caller, located in the loopback zone, is transmitted on the one hand directly to the other party via loopback and on the other hand to at least one of the base station controllers.

This embodiment makes it possible to respond to the legal interception requirements, according to which any transmitted data must transit via the MSC. The objective of a gain in terms of time and savings in compression/decompression is maintained, an embodiment of the invention thus makes it possible to use the radio link only for sending the data back up. This differs from the much more costly conventional techniques, according to which the data reverts back up to the BSC and then comes down from it.

According to a specific embodiment of the method of the invention, said first detecting phase is implemented in a first module located in a central portion of the network, and said second phase of triggering a local loopback operation is implemented in said local zone of said cellular network under control of said first module.

An embodiment of the invention further relates to a cellular network implementing the previously described method.

According to an embodiment of the invention, in such a cellular network, each BTS, or each set of BTSs connected to the same transmission equipment to the BSCs, is advantageously equipped with a local adapter equipment comprising:
  means for detecting the need for loopback;
  means for carrying out the loopback operation;
  means for detecting the need for removing the loopback;
  means for carrying out the operation for removing the loopback,
  the means implementing the method such as described previously.

According to another embodiment of the cellular network according to the invention,
  on the one hand each local zone constituted of a BTS, or a set of BTSs connected to the same transmission equipment to the BSCs, is equipped with a local adapter device and,
  on the other hand the network comprises a central optimising device.
In this embodiment,
  said central optimising device has means of detecting a need for loopback and/or removal of a loopback in one of said local zones;
  the optimising device comprises means of issuing a command for loopback and/or removing a loopback to any adapter device located in a local zone wherein it has detected said need for loopback and/or removal of loopback;
  each one of said adapter devices has the means of carrying out the loopback operation or of removing the loopback under the control of the loopback or loopback removal command, respectively;
  said means implementing the method such as described previously.

An embodiment of the invention relates to any cellular network, of the type comprising at least one base station controlled by a base station controller, called BSC, and a network infrastructure with which the BSC is in connection, the network infrastructure including:
  either at least one link of the radio with shared resources type to connect the base station(s) to their control BSC;
  or at least one link of the IP type to connect said base station(s) to their control BSC;
  or even any backhaul link.

Finally, an embodiment of the invention relates to any local detector and/or adapter equipment implementing the method such as described previously.

BRIEF DESCRIPTION OF THE DRAWINGS

Other characteristics and advantages shall appear when reading the following description of several preferred embodiments of the invention, given by way of an indicative and non-limiting example (all of the embodiments of the invention are not limited to the characteristics and advantages of this preferred embodiment), and the annexed drawings, wherein.

DETAILED DESCRIPTION OF ILLUSTRATIVE EMBODIMENTS

1. General Principle

An embodiment of the invention is therefore based on an approach which is entirely new and inventive of transmitting speech flow in a GSM network implementing a radio transmission link, in the case where two users depend on the same base station or of two nearby base stations, by introducing a device connecting locally two stations mobiles: a local loopback is realised when two users of the cellular network are in communication in a zone referred to as a loopback zone.

The general principle of the local loopback of an embodiment of the invention in the case of a backhaul radio link with shared resources, is shown in relation with FIGS. 4A and 4B and 6A and 6B, distinguishing four embodiments of local loopback according to an embodiment of the invention.

Figure 1:
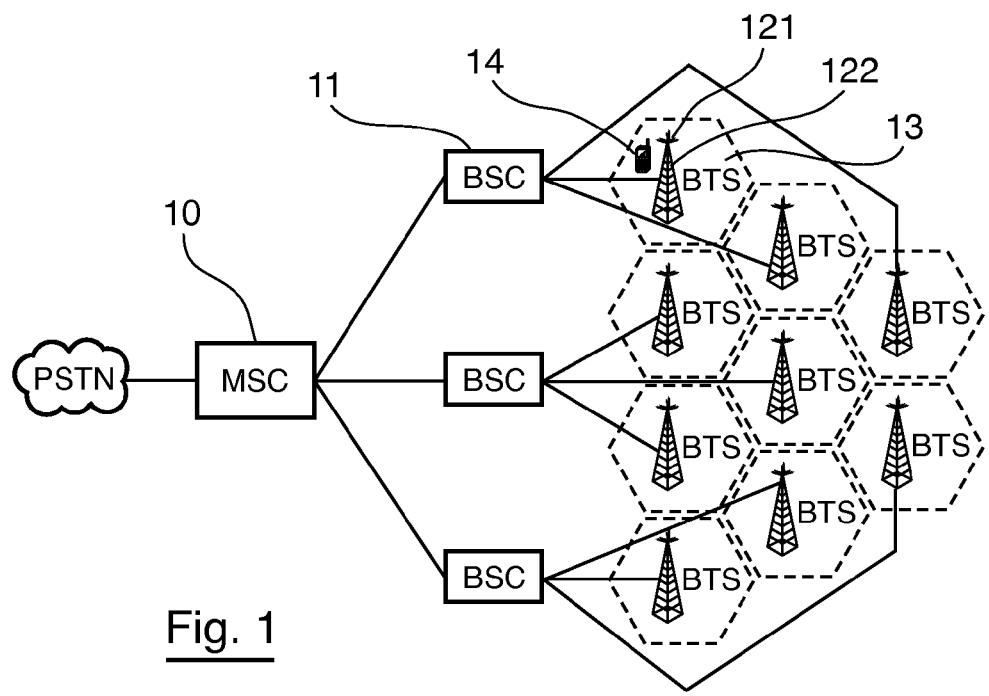
FIG. 1, already presented in relation with prior art, shows the architecture of the GSM network.
Figure 2:
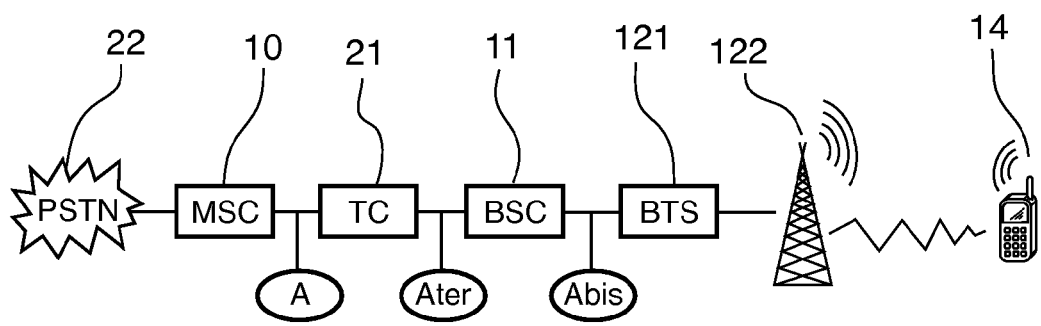
FIG. 2, already introduced in the prior art section, shows as a diagram the interfaces implemented in a GSM cellular network.
Figure 3:
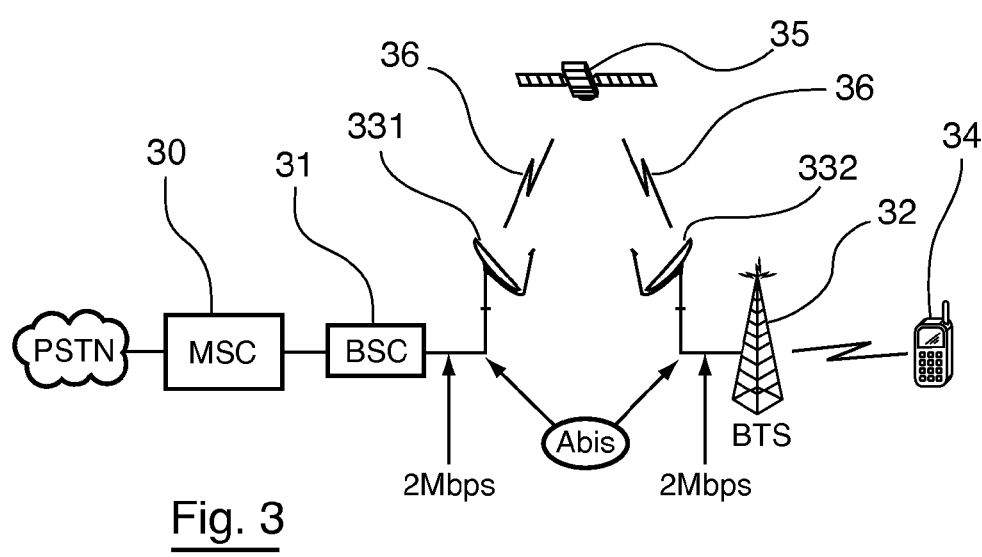
FIG. 3 relates to the implementation of a radio link via satellite in a GSM network, according to prior art.
Figure 4A:
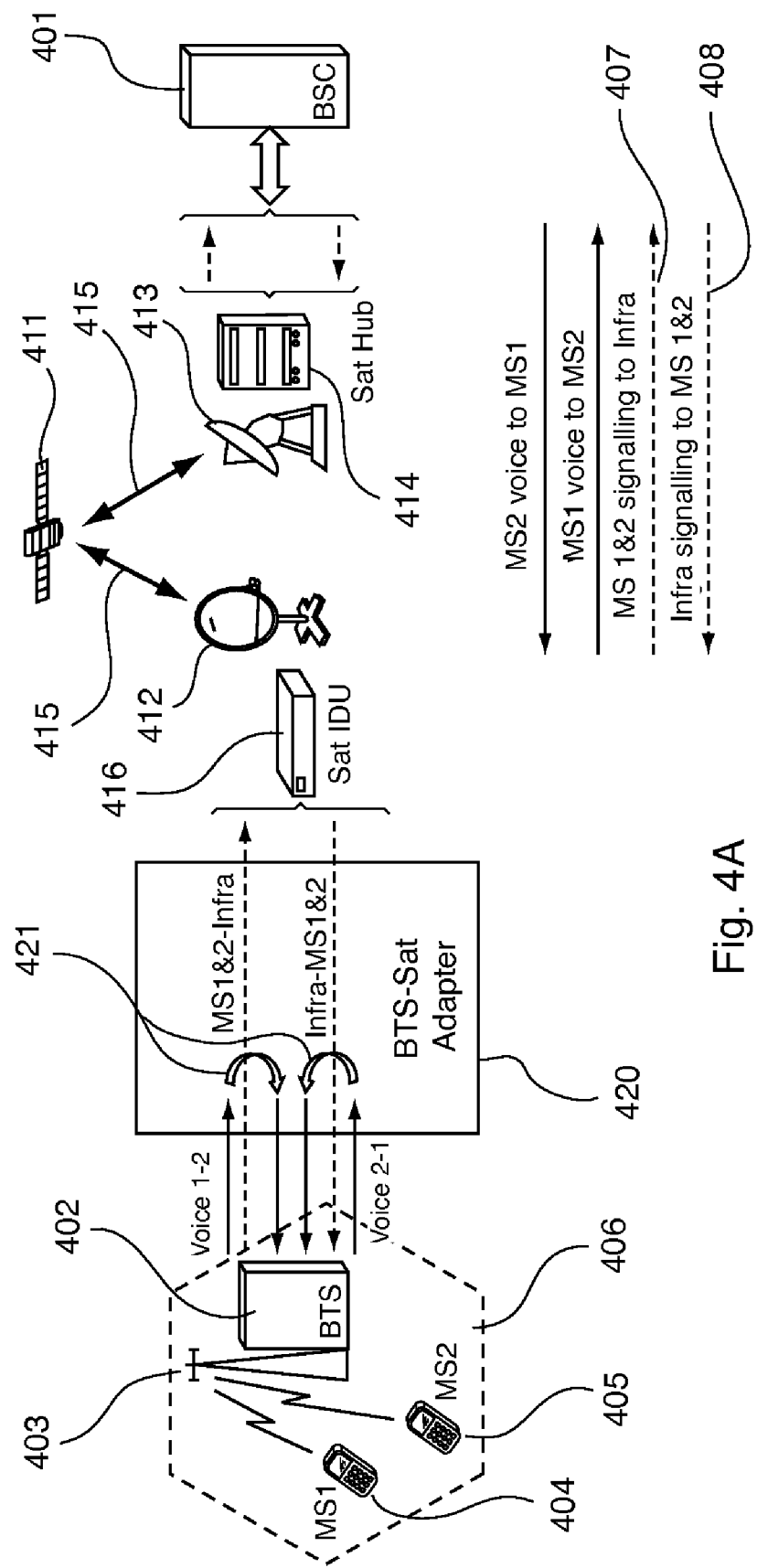
FIGS. 4A and 4B show the local loopback in a satellite backhaul network, according to a first and a second modes of implementing an embodiment of the invention wherein the loopback takes place for users located in the same cell, or in two nearby cells, respectively.

In relation with FIG. 4A, consider a cellular network containing a BSC 401, controlling a base station BTS 402. This BTS 402 provides the transmission of speech data between two users each having a mobile station MS1 404 and MS2 405, via its radio antenna 403. In this embodiment, the two users are located in the same cell 406 of the cellular network, therefore in the loopback zone.

The link between the BSC 401 and its corresponding BTS 402 is provided by a set of radio communication equipment comprising in particular a geostationary-earth-orbiting satellite 411, as well as two emitting and receiving antennas 412 and 413 thus forming a radio link 415 on which the traffic and signalling data, typical of the GSM system, transits. This radio link 415 is furthermore provided by a device 414, called Hub, in charge of allocating the radio resources needed to transfer the data, according to the traffic needs of the GSM network. The Hub operates by communicating with an IDU device 416 (for "Indoor Unit"), the hub and the IDU together integrating all of the intelligence and the control logic of the radio network.

The radio link is therefore in charge of transporting a set of data relative to the GSM network, intended solely for the MSC or the BTS. It more particularly makes it possible to have the signalling data transited, via two flows 407 and 408, each corresponding to the caller and to the called party.

According to an embodiment of the invention, a device 420 thus analyses these flux, in one of its embodiments, in such a way as to detect the local nature of the call.

In this precise case, the device 420 of an embodiment of the invention detects that two users located in the same cell 406 are in communication, and then implements a loopback 421.

Figure 4B:
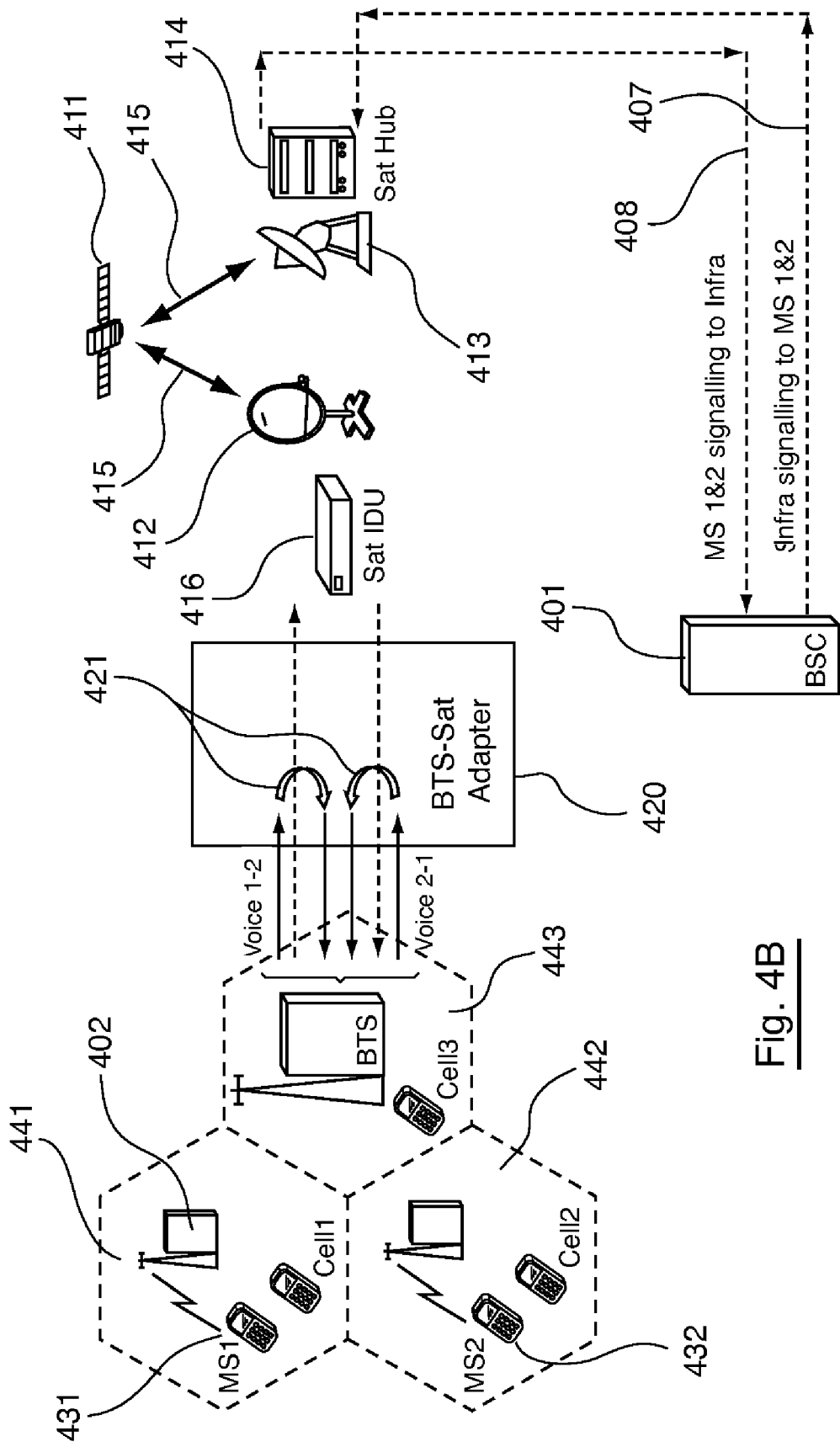

In a second embodiment, the device of the invention 420 implements a local loopback 421, shown in FIG. 4B. In this configuration, two users each having a mobile station 431 and 432 are located in two cells 441 and 442 that are distinct and neighbouring. Each of these cells is covered in the network by a BTS 402. These two cells are in addition located in the vicinity of a third cell 443, covered by a third BTS. The three BTS 402 are located downstream of the same device 420 of an embodiment of the invention, in relation to the radio link.

According to a principle similar to the first embodiment of the local loopback shown, the device 420 of an embodiment of the invention analyses the content of the traffic messages 407 and 408 and when it detects the local nature of a call, implements a loopback, even if two users are located in two different cells.

Figure 7A:
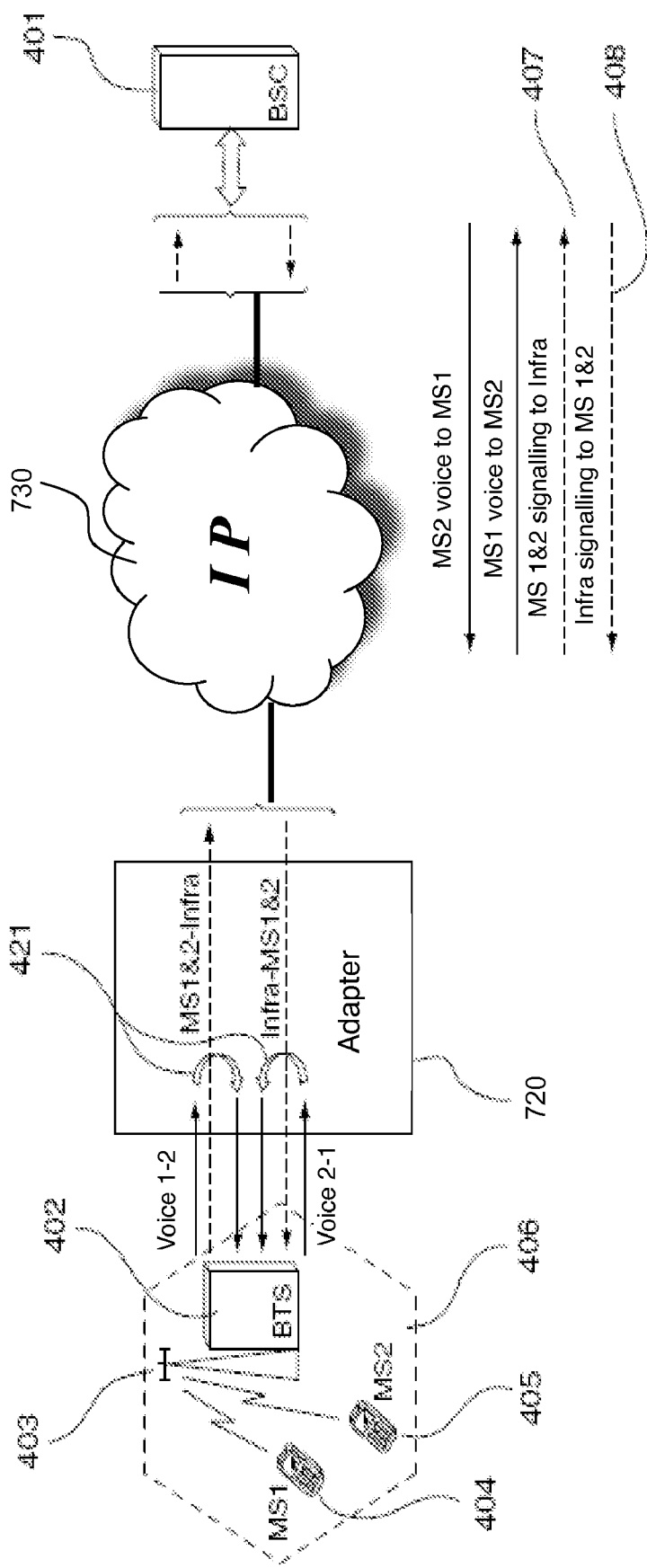
FIGS. 7A and 7B show a possible alternative embodiment of the invention, according to embodiments similar to those in FIGS. 4A and 4B respectively, in the case where the backhaul link is constituted by an IP network
Figure 7B:
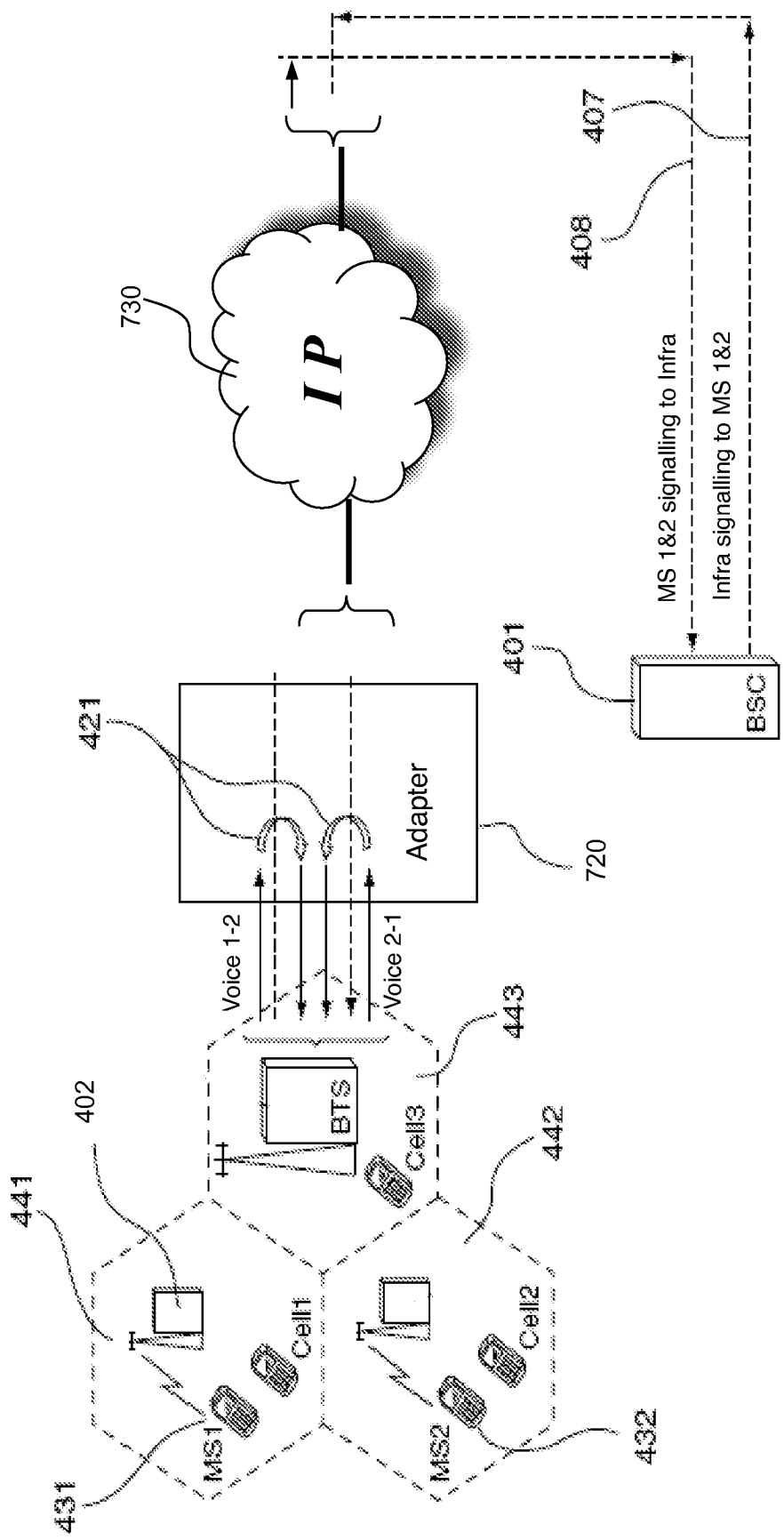

Note incidentally that these two embodiments are also applicable to a network of which the backhaul link 730 is an IP network, as shown in FIGS. 7A and 7B. In such a case, an adapter device 720 substantially fulfils the same functions of detecting and of triggering the loopback as the device 420.

Figure 6A:
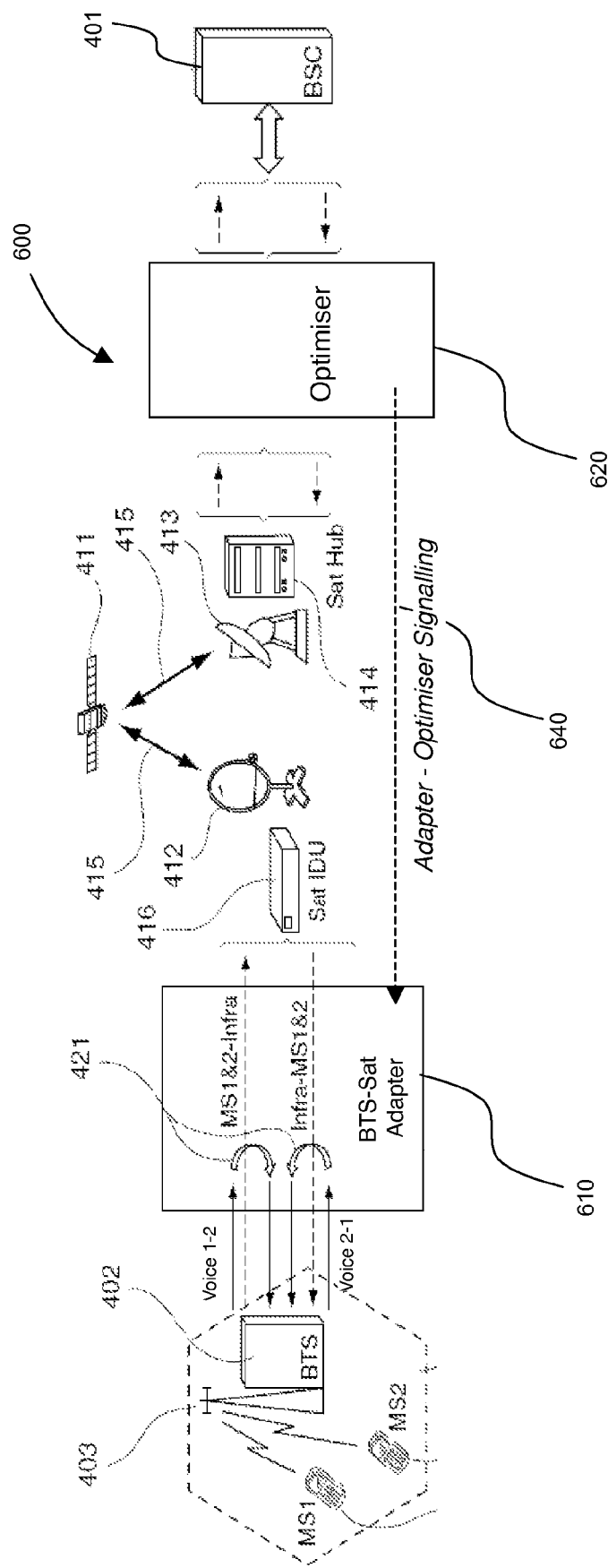
FIGS. 6A and 6B show the implementation of an embodiment of the invention in a satellite backhaul network, according to a third and a fourth embodiment wherein the loopback takes place for users located in the same cell, or in two nearby cells, respectively.
Figure 6B:
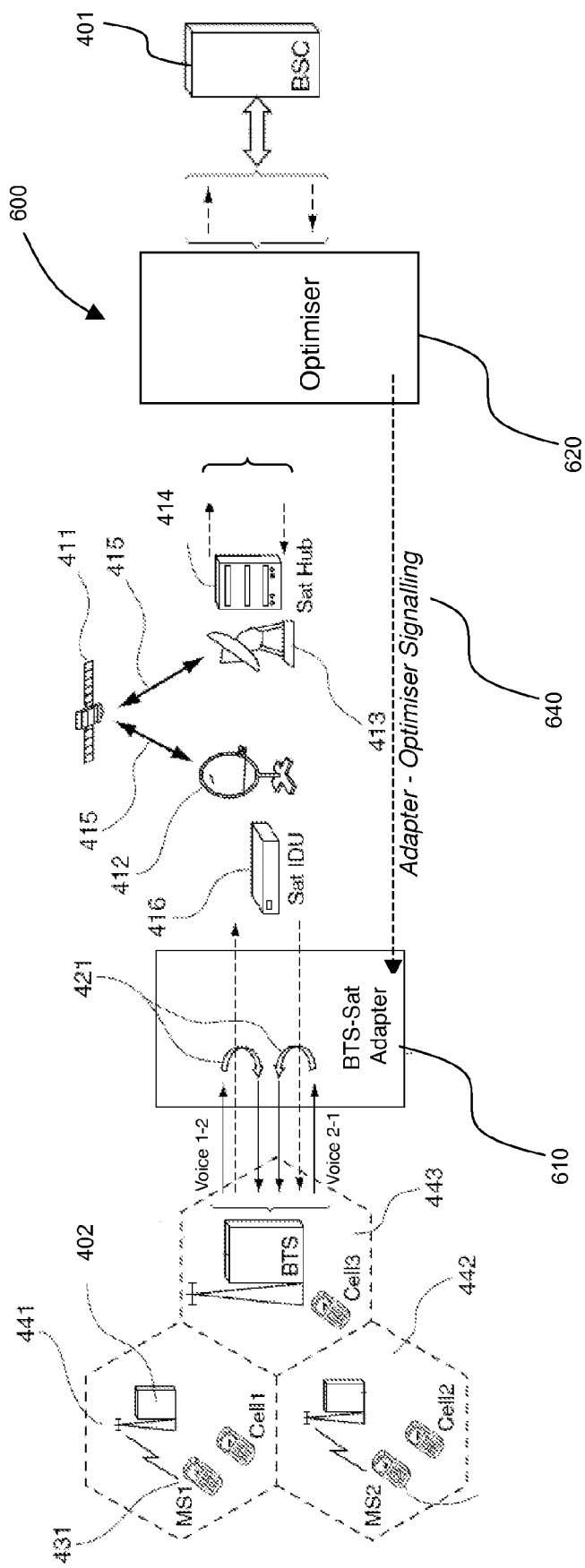

In a third and a fourth embodiment, the system makes use of two devices, 610 and 620 represented in FIGS. 6A and 6B. The principle is similar to the first embodiment, but there is a separation of the functions which, in the first and the second embodiments, were grouped together in the device 420 of FIGS. 4A and 4B. This separation is accomplished by distributing the functions of detecting and of triggering the loopback (and/or removal of the loopback) between pieces of equipment 610 and 620 as follows:

the detection device (or optimising device) 620, located in a central zone of the network (beyond the backhaul link 630 constituted by the satellite 411 and the associated equipment), analyses the flow of signalling data so as to detect the local nature of the calls;

where applicable the detection device 620 sends a command to the device 610 by an internal channel 640 linking the devices 620 and 610;

in response to this command, the device 610, which is located in a local zone at the periphery, in the vicinity of one or several BTSs, implements the loopback (or the removal of the loopback).

Note that this distributed architecture is applicable to the two previously described situations: loopback within the same cell (FIG. 6A) or loopback between two cells that depend on the same local equipment 610 (FIG. 6B).

Figure 8A:
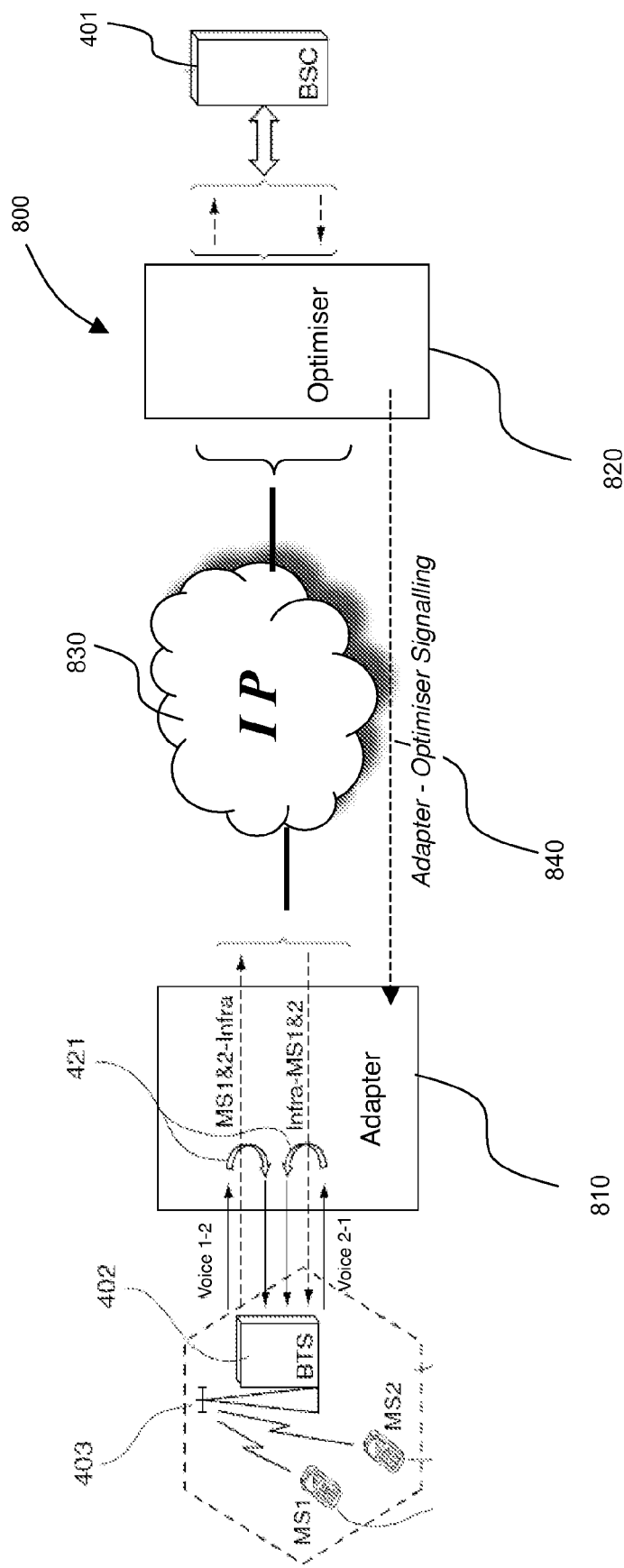
FIGS. 8A and 8B show another possible alternative embodiment of the invention, according to embodiments similar to those in FIGS. 6A and 6B respectively, in the case where the backhaul link is constituted by an IP network.
Figure 8B:
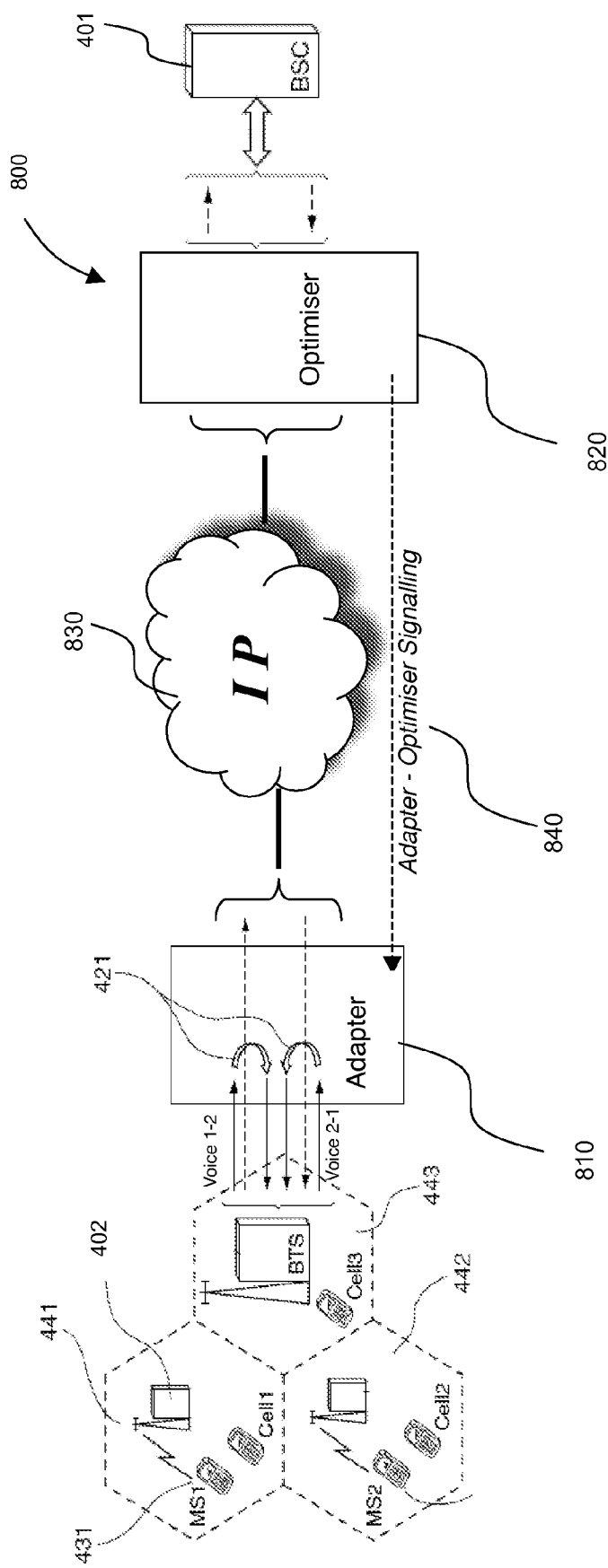

The same distribution principle between a central detection device 820 located in a central zone 800 of the network and local device 810 for triggering the loopback located in a local zone can also be implemented in a network of which the backhaul link 830 is an IP network, as shown in FIGS. 8A and 8B. In this case, the loopback commands are carried by a signalling channel 840 connecting the detection device 820 to the device 810 for triggering the loopback. FIGS. 8A and 8B correspond to the aforementioned cases of a loopback either within the same cell (FIG. 8A), or two cells controlled by the same BTS 402 (FIG. 8B) respectively.

Advantageously, the commands 840 for loopback (and loopback removal) are carried via a channel of the IP link. Likewise, in the embodiments of FIGS. 6A and 6B, the commands 640 are advantageously carried via a channel of the radio link 415.

In sum, the device of an embodiment of the invention implements a local loopback in two distinct cases: on the one hand (FIGS. 4A, 6A, 7A, 8A) when two users are in communication and are located in the same cell (they are both in the coverage area of the same base station BTS), and on the other hand (FIGS. 4B, 6B, 7B, 8B) when two users are in communication with two neighbouring BTSs, but for which the interface Abis is connected to the same adapter device connected to the same radio terminal via satellite.

Still in sum, there are also different implementations, depending on whether the analysis of the signalling data and the execution of the loopback and/or loopback removal are carried out in the same piece of equipment, at the periphery and collocated with the BTSs (FIGS. 4 and 7)

the analysis is accomplished in a central equipment that controls a multitude of equipment at the periphery, executing the loopback and/or loopback removal under the control of the central equipment (FIGS. 6 and 8).

In these various cases, the speech flows are then looped back upstream of the BTS(s) just downstream of the radio link (FIGS. 4 and 6), or of the IP link (FIGS. 7 and 8). The latter is therefore not used for the data exchanged between caller and called party, i.e. that, contrary to conventional techniques, the speech data does not revert back up to the BSC and the MSC located upstream of the backhaul link (radio, IP or other). As such, in the case of a satellite link, two bi-directional radio channels are saved.

A technique for detecting the local nature of a call is described in the rest of this description, then a technique for implementing the loopback of the speech, in a particular embodiment.

2. Strategy of Detecting the Local Nature of a Call

In such a way as to carry out the loopback of the speech, it is above all necessary to reliably detect the relative location of two users involved in the same communication.

In a cellular network such as the GSM system, as soon as a user emits or receives a call, the equipment generates a series of exchanges of signalling messages, accomplishing an "originating call" or a "terminating call". The network thus handles a large quantity of "half-calls" of this type. When two users are in communication, the originating half-call of the caller is highly correlated with the terminating half-call of the correspondent.

One of the major problems of an embodiment of this invention is therefore to detect, within the network, the correspondence between two half-calls, and as such know, reliably and without error, the local nature of the call.

The main contribution of an embodiment of the invention is indeed to provide a strategy for optimising the process of detecting the possibility for loopback, and of the loopback itself.

The detection strategy of the local nature of a call developed by the inventors is based on the use of several approaches, which can be grouped together into two broad categories: a main work on the contents of the signalling channels, without neglecting recourse to an analysis of the flow of speech itself.

2.1. Detection by Analysing Signalling Messages

The inventors have observed that to date, in the basic signalling of a GSM network visible on the interface Abis, there are no indicators making it possible to correlate the departing call and the corresponding arriving call.

However, various data is common to both portions of the call, and can be used to correlate two half-calls.

When a caller and a correspondent are placed into communication, among the signalling messages contained in the signalling channel corresponding to each half-call, a message contains in particular an element referred to as CONNECT message (arrival side) and CONNECT message (departing side). These two messages follow each other in this order and the reception time between the two has the advantage of being relatively repetitive, since no major random factor occurs.

An embodiment of the invention then proposes to base itself on this time correlation to detect that the two half-calls correspond.

However, instead of examining the standard content of the signalling channel, an embodiment of the invention proposes a second aspect of examination according to which a specific piece of data is injected into the signalling flow, which is intended to be recognised by a device of an embodiment of the invention, and will allow the latter to detect with certainty that the communication is local.

It is necessary to be vigilant as to the contents of this data injected in order to avoid having an unacceptable rate of false detections through collision between two unrelated half-calls. For this, the data injected must contain a variable non-repeatable portion, such as an identifier of the cell, or an identifier specific to the entity to which is added a marker that is specific to the call.

An additional difficulty linked with this approach of injecting data consists in making this data acceptable when the called party is anyone and located in another network. The method of an embodiment of the invention limits how often this case occurs if the step of injecting is carried out solely after the response to the PAGING message contained among the flow of the signalling messages. The implementation of a step of time correlation such as defined previously, in the signalling flow, further makes it possible to limit the cases of injecting superfluous data.

The solution adopted then consists in making use of the User-User field, which is an optional field appearing in the signalling channel in the CONNECT message. More precisely, it is sent to the off-hook in the arrival CONNECT message, then copied in the departing CONNECT message.

This element is then added on the fly, with a sufficiently long digital content, according to a non-repeatable code.

Note that, for the proper operation of this solution, the MSC of the cellular network has to implement the User-User functionality.

In order to not disturb a correspondent other than the one possibly present in the loopback zone, the User-User field is IA5 coded (for "International Alphabet 5"), coding of a sequence of characters according to which each character is coded over 7 bits. With such an approach, an untimely message risks to be displayed by the portable telephone of the caller when the latter is not located in the local zone of the called party. The possible prior test of time correlation makes this occurrence rare.

Another solution without defect consists in reserving an encoding code specific to the application. This requires approval from the standardisation committees, which can be obtained through the active support of an operator, for example. The advantage of such a solution is to suppress any untimely displays of the User-User message for recipients that are not concerned.

The procedure is therefore as follows: the device of an embodiment of the invention, located, recall, upstream of the BTS covering the loopback zone wherein two users in communication are located, monitors the signalling channels the arrival of a CONNECT message, in the departing half-calls as well as in the arriving half-calls. When a CONNECT message is sent to the MSC of the cellular network, i.e. on the arrival side, the device of an embodiment of the invention modifies the message in order to include in it an IA5-coded User-User field, encoding an identity and/or a random value.

If a CONNECT message on the departing side is detected by the device of an embodiment of the invention with a User-User field of the same content, the two half-calls are considered as corresponding.

2.2. Detection Via Analysis of Speech Flow

The inventors have moreover explored the solutions offered by the speech signal itself. Here too, two examinations are considered: a first direction according to which an attempt is made to detect, or correlate the data that is common to the flows of speech contained in the two half-calls, and/or a second direction according to which an attempt is made to inject into the flows of speech data that will be used to detect the local nature of the call.

The most reliable data is indeed the direct correlation of speech flows. Such a correlation is accomplished at the beginning of the communication, and triggers the loopback.

Conventionally, in a GSM network, the speech is transmitted in compressed format between the BTS and a transcoder located on MSC. It is then converted to digital uncompressed PCM format. This signal is then compressed again in order to be sent to the BTS serving the second party.

This double transcoding thus destroys the resemblance of the digital speech flows, it is therefore very difficult to use these flows as a basis for an examination of the correlation.

However, there is a transmission mode, called TFO mode (for "Transcoder Free Operation") which avoids this double transcoding. The speech is transmitted in the central network, i.e. between the devices called TRAU (for "Transcoder Rate Adapter Unit") in charge of compressing the flow of speech. The principle of such a transmission mode is to transmit the speech in PCM mode over 6 bits per byte, and the digitised speech as well such as provided by the mobile over 2 bits per byte. The TRAU, if it is activated in TFO mode, can then transmit to the corresponding mobile the digitised speech such as provided by the departing mobile: the double transcoding is as such avoided and the correlation between the two flows of speech is maintained.

If it is used, the TFO mode must be recognised by the remote TRAU. This is obtained, according to the GSM standard, via a prior dialogue between the two remote TRAU, once the connection is effectively set up, i.e. once the CONNECT messages of the signalling channel have been received. The dialogue established is then continuous, by using the residual capacity between the available 16 kbits per second and which is needed for the speech, i.e. a maximum of 13 kbits per second for a compressed format.

The activation of this TFO mode therefore has the advantage of making possible a comparison between the two speech flows, digital block by digital block. In this mode, a block emitted is found again as it is at reception, within a known timeframe.

Note that the identical transmission of the flows of speech is accomplished by the receiver only once it has been verified that the two TRAUs are in TFO mode: this procedure creates a delay between the setting up of the communication and the detection that it does indeed entail the same flow on the two branches.

According to a different approach, it is possible to inject data into the speech signal itself.

Once the connection has been made, the invention proposes, in a particular embodiment, to inject in particular multifrequency signals with two tones (DTMF for "dual tone multifrequency"). The correlation examination is then accomplished on the values, but also on the length and on the time delay of the messages. However, this solution has the risk of being able to be heard by the correspondent.

In the embodiment wherein the TFO mode is activated, the invention proposes to hide specific data. This then makes it possible to accelerate the detection of the identity between the two flows, in relation to a simple comparison of the speech.

3. The Loopback Operation of the Speech

For more clarity, we shall refer to the embodiment wherein the detection of the local nature of a call is based on the successive reception and analysis of the CONNECT messages (introduced in paragraph 2.1 of this description).

Those skilled in the art will know how to easily transpose the technique shown to the other detection modes introduced previously.

When a CONNECT message is emitted by the correspondent, the speech is in emission-reception. Upon reception on the caller side of this message by the device of an embodiment of the invention, and if the latter detects the local nature of a call, the speech is looped back directly on the departing side to the arriving side, with no loss.

Inversely, in order to be able to loopback the speech in the opposite direction, i.e. from the arrival to the departure, it is necessary to be vigilant due to the fact that a portion of the speech is in transit via the MSC of the cellular network. Recall that in the case of a loopback, the speech flows no longer transit by the MSC. It is therefore necessary to ensure a transition at the time of the loopback operation of the speech, in such a way that no data is lost.

To do this, the device of an embodiment of the invention proposes to buffer the speech coming from the correspondent, in a memory buffer of suitable size. As such, the speech coming from the MSC is first of all sent, then the memory buffer takes over, being emptied progressively, by removing the frames of silence, thanks to a silence suppression algorithm.

As such, the all of the speech frames is correctly restored: the quality of service is equivalent to conventional techniques.

In a third embodiment, the speech is buffered right at the start of the communication, on the arrival side. The flow coming from the MSC does not transit. The loopback is accomplished via the buffer, which is emptied progressively. However, this approach has the disadvantage of requiring more memory when the loopback is not accomplished. However, the technique has the advantage of having a minimal delay if the speech coming from the arrival is empty.

4. Handling Intercellular Transfers

During communication, the caller or the correspondent can move, and as such modify the conditions of the call, and more precisely change cells. This is referred to as an intercellular transfer ("handover"). The situations examined are as follows:

the two users are in communication in the loopback zone, the loopback is active, then one of the two users leaves the loopback zone (outgoing "handover");

two users are in communication in the loopback zone, then one of the two users changes cells, while still remaining in the loopback zone (internal "handover").

4.1 Internal Handover

Recall that an embodiment of the invention proposes a local loopback not only when two users are located in the same cell, but also in the case where they are in two different and neighbouring cells.

The objective here is then to detect the change in cell of one of the users, with communication in progress, while the local loopback is active, and to maintain this loopback if the new cell detected still belongs to the loopback zone. For this, the analysis of the signalling channels is once again implemented. The device of an embodiment of the invention detects the presence of the HANDOVER COMMAND message within the exchanges of signalling relative to the looped back communications. The data of this message makes it possible to know the new cell and the new circuit. However, the device of an embodiment of the invention must for this know the configuration of the different cells, and is thus configured as such. A maintenance of the characteristics of the cellular network is therefore carried out, according to the modifications made by the operator.

An embodiment of the invention thus analyses the content of the HANDOVER COMMAND message as soon as it is detected in order to check if the destination cell is in the loopback zone. If that is the case, an embodiment of the invention carries out a step of searching for a new channel and activates the loopback via this new channel found.

In parallel, a local maintenance is executed on the equipment, concerning the technical data making it possible to analyse messages, such as in particular the configuration data of the cells, the data needed for decoding certain fields of signalling channels, contextual decoding, etc.

4.2 Outgoing Handover

In this configuration, the detection of the handover is based on the same principle as for the internal handover, i.e. on the searching for and analysis of the HANDOVER COMMAND message within the exchanges of signalling relative to the looped back communications. However, instead of searching for a new channel, the final purpose here is to deactivate the local loopback in order to switch back to conventional transmission of the speech via the MSC of the cellular network.

If the user B is the user leaving the loopback zone, and the user A is the one remaining in the loopback zone. Then when the HANDOVER COMMAND message of the user B is detected, the device of an embodiment of the invention begins to send the outgoing speech coming from the user A to the MSC of the network. This results in the introduction of a silence, seen from A. In addition, the devices sends to A the flow of speech coming from the MSC, which will also result in the introduction of a silence.

5. The Legal Interception Requirement

The local loopback according to an embodiment of the invention is such that the MSC does not receive the flow of speech. In certain countries or networks the possibility of legal interception is mandatory, and the speech has to go through the MSC so that the legal interception such as specified in the standard is possible.

Figure 5:
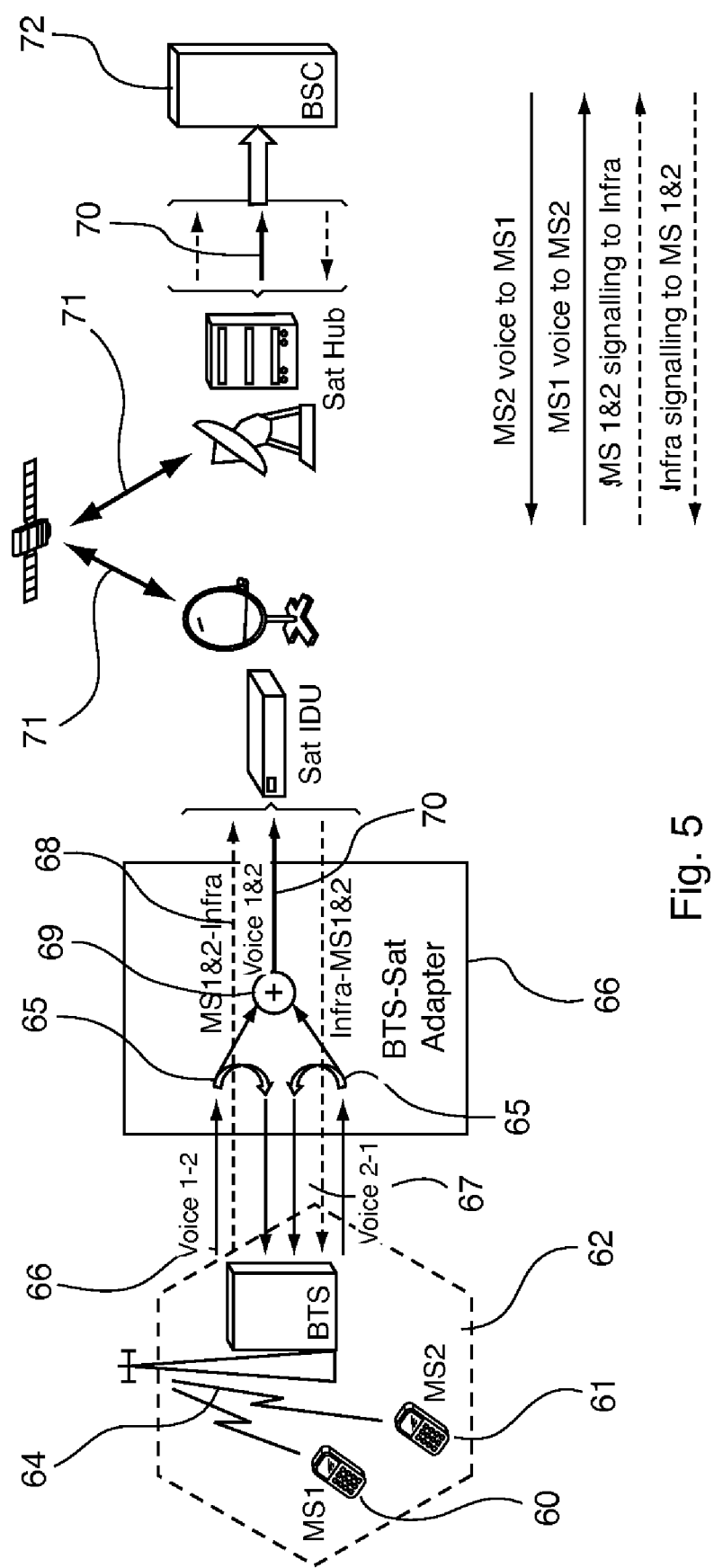
FIG. 5 relates to the going back up of the flows of speech to the BSC and the MSC.

In order to overcome this problem, an embodiment of the invention thus proposes to revert the flow of speech back up to the MSC, in relation with FIG. 5. Such a technique limits the gain obtained via the local loopback, but does not cancel it.

Indeed, recall that without loopback, each direction of the speech passes twice through the satellite link.

The technique of an embodiment of the invention is based on the fact that the coming back down of the speech can be suppressed without restricting the possibility of legal interception.

More precisely, two users of mobile stations 60 and 61 are in communication and are located in the same cell 62 covered by the same BTS 63. They are therefore in the loopback zone and a loopback 65 is carried out on the two flows of 66 and 67 upstream of the BTS 63. Indeed, the device 66 of an embodiment of the invention has detected in the signalling channels 67 and 68 data indicating the local nature of the call.

So as to respond to the legal interception requirements, the adapter 66 combines 69 the two flows of speech 66 and 67 in order to send them back up to the MSC in a signal 70 via the radio link via satellite 71 and the BSC 72.

It is also possible to send the two flows back up independently one from the other. The combination thus makes it possible to gain a channel.

Such a combination can be realised in several ways, and it is necessary to test each approach in order to evaluate the best performance.

In a first case, the flows are transcoded, added and then transcoded again: this approach is costly. In a second case, a selection is made frame by frame, by choosing one of the two flows of speech. This results in a loss of the speech when both of the parties speak at the same time. Finally, it is possible to transmit the two flows by putting them into sequence. This technique ensures that no speech is lost and is equivalent to the use of a good allocation algorithm in the case where the two flows of speech are transmitted independently from one another.

An embodiment of the invention provides a unique transmission procedure that is independent of the relative location of the calling and called stations, without impact on the overall architecture of the cellular network implemented. The equipment in the cellular network is therefore not modified by the system of an embodiment of the invention, which remains entirely transparent with regards to the BTSs and to the BSC in particular.

An embodiment of the invention in particular provides a technique that provides a major gain in terms of time and cost in relation to conventional techniques of prior art in situations of local communications, i.e. when the stations in communication are sufficiently close to one another.

Such a technique is particularly adapted to the case of cellular telephony.

An embodiment of the invention reduces the costs of a communications system, while still maintaining an equivalent quality of service, and even better than that obtained with the conventional techniques.

An embodiment of the furthermore provides such a technique that is particularly optimised and adapted to the transfer of data for phonic communications, i.e. for the transfer of voice and, more generally, to the transfer of data in real time of the circuit type.

Therefore, an embodiment of the invention proposes such a technique that makes it possible to reliably identify the local nature of a call.

An embodiment of the invention provides such a technique that is implemented easily in a standard architecture of the GSM network, but also in its extensions, such as UMTS and more generally all of the standards of the 3GPP (for "Third Generation PartnerShip") project, or any other cellular network, wherein a radio link, of the satellite type in particular, is implemented.

An embodiment of the invention is easily incorporated into such an architecture to which is added a link of the Internet type, according to the Internet IP protocol in particular.

An embodiment of the invention provides a technique that causes no loss of data if a user changes cells while communication is in progress, i.e. in the case of an intracellular transfer ("handover"). More generally, no function or service is deteriorated by the implementation of an embodiment of the invention.

Although the present disclosure has been described with reference to one or more examples, workers skilled in the art will recognize that changes may be made in form and detail without departing from the scope of the disclosure and/or the appended claims.

The invention claimed is:

1. Method of transmitting data in a mobile radio communication cellular network, wherein:
    setting up, maintaining and terminating a data communication channel between a caller and a called party located in said cellular network are implemented by exchanges of signalling messages,
    a caller and/or a called party each being located in a local zone of said cellular network,
    the method comprises:
        a first detecting phase if the caller and the called party of said communication are located in the same local zone of said cellular network, according to a detection strategy including a step of analysing all or a portion of said signalling messages by a adapter device located upstream of at least one base station of the cellular network and downstream of a base station controller; and
        a second phase of triggering a local loopback operation of all or a portion of data exchanged between the caller and the called party, in a case where said detecting phase confirms a local nature of said communication between the caller and the called party.

2. Method of transmitting as set forth in claim 1, wherein said local loopback operation is implemented by the device implementing the step of analyzing all or a portion of said signalling messages or another device located upstream of the at least one base station of the cellular network and downstream of the base station controller.

3. Method of transmitting as set forth in claim 1, wherein said local zone is defined by the coverage area downstream of said base station, or of a set of said base stations.

4. Method of transmitting as set forth in claim 1, said base station being controlled by said base station controller among a plurality of base stations controllers and said base station(s) being connected with said base station controller(s) via a connecting network, wherein said local loopback comprises carrying all or a portion of the data exchanged between the caller and the called party without transiting by said base station controllers.

5. Method of transmitting as set forth in claim 4
said connecting network including at least one link of the radio with shared resources type between said base station(s) and said base station controller(s),
wherein said local zone is defined by a zone located downstream of a connection point with said link of the radio with shared resources type.

6. Method of transmitting as set forth in claim 1, the succession of said signalling messages forming signalling flows, wherein said detection strategy includes a step of injecting into said signalling flow of at least one piece of tracking data in the local zone of said caller party and/or said called party, and comprises recognising said tracking data in the local zone of the other of said parties.

7. Method of transmitting as set forth in claim 6 wherein said tracking data is constituted by at least one piece of data representative of said local zone, and/or a marker specific to a call within calls in progress in said local zone.

8. Method of transmitting as set forth in claim 6, wherein said signalling messages are compliant with the GSM standard and said tracking data is encoded in a User-User field of a CONNECT message or of a SETUP message.

9. Method of transmitting as set forth in claim 1, wherein said detecting phase comprises a prior step of detecting a time correlation between emission and reception of predetermined signalling messages.

10. Method of transmitting as set forth in claim 9 wherein said predetermined signalling messages belong to the group comprising:
departing SETUP and PAGING messages;
arriving CONNECT and departing CONNECT messages.

11. Method of transmitting as set forth in claim 9, wherein said detection strategy is accomplished in two periods:
implementation in a first period of time of said step of detecting the time correlation between the transmissions of predetermined signalling messages;
implementation in a second period of time of the step of injecting said tracking data if and only if a time correlation has been detected.

12. Method of transmitting as set forth in claim 1, the traffic channel of the communication carrying data with a real-time constraint, such as a flow of speech,
wherein said detection strategy includes a direct analysing phase of said data with a real-time constraint.

13. Method of transmitting as set forth in claim 12, said data including a flow of speech, wherein said analysing phase of the speech flow comprises an additional step of injecting into said flow of speech a signal of the DTMF type in the local zone of one of said caller or called parties and of recognising said tracking data in the local zone of the other of said parties.

14. Method of transmitting as set forth in claim 12, said data including a flow of speech, and said cellular network being compliant with the GSM standard, wherein said step of analysing the flow of speech is implemented after a Transcoder Free Operation (TFO) mode has been activated.

15. Method of transmitting as set forth in claim 14, the TFO mode being activated, wherein said step of direct analysis comprises a phase of injecting at least one piece of specific information into the flow of speech in order to accelerate detection of the identity between the two flows in relation to a simple comparison of the speech.

16. Method of transmitting as set forth in claim 1, wherein said second phase of triggering a loopback operation comprises a preliminary phase of storing in a memory buffer of the data coming from said correspondent, in such a way as to ensure continuity in the flow of said data to be transmitted.

17. Method of transmitting as set forth in claim 1, wherein the method comprises the following additional steps:
searching for, detecting and analysing in said signalling messages data indicating a displacement of said called party and/or said correspondent, during communication.
adaptation of the communication channels according to a result of said step of searching, detecting and analysing.

18. Method of transmitting as set forth in claim 17, wherein said information indicating a displacement is constituted by a signalling message indicating characteristics of a new cell of said cellular network between said called party and/or said called party in displacement.

19. Method of transmitting as set forth in claim 18, wherein said signalling messages are compliant with the GSM standard, and said message comprises a HANDOVER_COMMAND message.

20. Method of transmitting as set forth in claim 17, wherein said step of adapting comprises the phases of:
adapting the loopback if the result of the analysis of said information indicating a displacement indicates that said caller and/or said called party is changing cells while still remaining in said loopback zone;
stopping the said loopback operation if the result of the analysis of said information indicating a displacement indicates that said caller and/or said called party are leaving the loopback zone.

21. Method of transmitting according to claim 1, wherein all or a portion of said data exchanged between said called party and said caller, located in said loopback zone, is transmitted directly to the other party via loopback and to at least one of said base station controllers.

22. Method as set forth in claim 1, wherein said first detecting phase is implemented in a first device located in a central portion of the network, and said second phase of triggering a local loopback operation is implemented in a second device located in said local zone of said cellular network under command of said first device.

23. Cellular network comprising:
means for setting up, maintaining and terminating a data communication channel between a caller and a called party located in said cellular network implemented by exchanges of signalling messages,
a caller and/or a called party each being located in a local zone of said cellular network,
means for implementing the following phases:
a first detecting phase if the caller and the called party of said communication are located in the same local zone of said cellular network, according to a detection strategy including a step of analysing all or a portion of said signalling messages by a device located upstream of at least one base station of the cellular network and downstream of a base station controller;
a second phase of triggering a local loopback operation of all or a portion of data exchanged between the caller and the called party, in a case where said detecting phase confirms a local nature of said communication between the caller and the called party.

24. Cellular network as set forth in claim 23, wherein each base station, called BTS, or each set of BTSs connected to the same transmission equipment to base station controllers, called BSC, in the network is equipped with a local adapter equipment comprising:
means for detecting a need for loopback;
means for carrying out a loopback operation;
means for detecting a need for removing the loopback;
means for carrying out an operation for removing the loopback, at least one of said means for implementing at least a step of the first and/or second phases.

25. Cellular network as set forth claim 24 and comprising the at least one base station controlled by the base station controller, called a BSC, and a network infrastructure with which said BSC is in connection, said network infrastructure including at least one link of the radio with shared resources type to connect said base station(s) to their control BSC.

26. Cellular network as set forth in claim 24 and comprising the at least one base station controlled by the base station controller, called BSC, and a network infrastructure with which said BSC is in connection, said network infrastructure including at least one link of the IP type to connect said base station(s) to their control BSC.

27. Cellular network as set forth in claim 23, wherein each local zone constituted of a base station, called a BTS, or of a set of BTSs connected to the same transmission equipment to the BSCs, is equipped with a local adapter device; and, the network comprises a central optimising device, and wherein:

said central optimising device has means of detecting a need for loopback and/or removal of a loopback in one of said local zones;

the optimising device comprises means of issuing a command for loopback and/or removing a loopback to any adapter device located in a local zone wherein the optimising device has detected said need for loopback and/or removal of loopback;

each one of said adapter devices has means of carrying out a loopback operation or of removing the loopback under control of a loopback or loopback removal command respectively.

28. Local detector equipment located in a cellular network which comprises:

means for setting up, maintaining and terminating a data communication channel between a caller and a called party located in said cellular network implemented by exchanges of signalling messages, a caller and/or a called party each being located in a local zone of said cellular network, wherein said local detector equipment comprises means for detecting if the caller and the called party of said communication are located in the same local zone of said cellular network, according to a detection strategy including means for analysing all or a portion of said signalling messages, the local detector equipment being located upstream of at least one base station of the cellular network and downstream of a base station controller.

29. Local adapter equipment located in a cellular network which comprises:

means for setting up, maintaining and terminating a data communication channel between a caller and a called party located in said cellular network implemented by exchanges of signalling messages, a caller and/or a called party each being located in a local zone of said cellular network, wherein said local adapter equipment comprises means for triggering a local loopback operation of all or a portion of data exchanged between the caller and the called party, in a case where a local detector equipment confirms a local nature of said communication between the caller and the called party, the local adapter equipment being located upstream of at least one base station of the cellular network and downstream of a base station controller.

* * * * *